(12) United States Patent
Otterbein (10) Patent No.: US 9,499,198 B2
(45) Date of Patent: Nov. 22, 2016

(54) STEERING SYSTEM FOR A VEHICLE AND STEERING METHOD FOR A VEHICLE

(71) Applicant: HUBTEX MASCHINENBAU GMBH & CO. KG, Fulda (DE)

(72) Inventor: Achim Otterbein, Grossenlueder (DE)

(73) Assignee: HUBTEX MASCHINENBAU GMBH & CO. KG, Fulda (DE)

( * ) Notice: Subject to any disclaimer, the term of this patent is extended or adjusted under 35 U.S.C. 154(b) by 1 day.

(21) Appl. No.: 14/409,473

(22) PCT Filed: Jul. 1, 2013

(86) PCT No.: PCT/EP2013/063795
§ 371 (c)(1),
(2) Date: Dec. 19, 2014

(87) PCT Pub. No.: WO2014/005977
PCT Pub. Date: Jan. 9, 2014

(65) Prior Publication Data
US 2015/0191202 A1   Jul. 9, 2015

(30) Foreign Application Priority Data
Jul. 2, 2012   (DE) .......................... 10 2012 105 831

(51) Int. Cl.
*A01B 69/00* (2006.01)
*B62D 7/15* (2006.01)
*B66F 9/075* (2006.01)

(52) U.S. Cl.
CPC ............. *B62D 7/159* (2013.01); *B62D 7/1509* (2013.01); *B66F 9/07568* (2013.01)

(58) Field of Classification Search
CPC .................. B62D 7/159; B62D 7/1509; B66F 9/07568
USPC ............. 701/41, 50; 414/685, 718, 728, 730
See application file for complete search history.

(56) References Cited

U.S. PATENT DOCUMENTS

| 5,609,220 A | 3/1997 | Moriya et al. |
| 7,384,233 B2 * | 6/2008 | Segerljung ............ B60B 19/003 414/685 |
| 2006/0155446 A1 | 7/2006 | Segerljung |
| 2006/0247837 A1 | 11/2006 | Segerljung |
| 2009/0178876 A1 * | 7/2009 | Miki ...................... B62D 7/142 180/411 |

FOREIGN PATENT DOCUMENTS

| DE | 42 03 867 A1 | 8/1993 |
| DE | 43 94 316 T1 | 7/1995 |
| DE | 199 49 351 A1 | 7/2001 |

(Continued)

*Primary Examiner* — Thomas G Black
*Assistant Examiner* — Luke Huynh
(74) *Attorney, Agent, or Firm* — Norman B. Thot (57) ABSTRACT

A steering system for a vehicle includes at least two wheels configured to be steered independently of each another. A steering setpoint generator is configured to steer the at least two wheels according to a steering program. An operating element is configured to rotate the vehicle during travel about a center of rotation which moves with a principal movement vector. The steering program is configured so that a direction of the principal movement vector of the center of rotation can be changed with the steering setpoint generator.

41 Claims, 4 Drawing Sheets

(56) References Cited

FOREIGN PATENT DOCUMENTS

| | | |
|---|---|---|
| DE | 201 17 198 U1 | 3/2002 |
| EP | 1 532 035 B1 | 5/2005 |
| EP | 1 657 140 B1 | 5/2006 |
| WO | WO 2004/007266 A1 | 1/2004 |

\* cited by examiner

STEERING SYSTEM FOR A VEHICLE AND STEERING METHOD FOR A VEHICLE

CROSS REFERENCE TO PRIOR APPLICATIONS

This application is a U.S. National Phase application under 35 U.S.C. §371 of International Application No. PCT/EP2013/063795, filed on Jul. 1, 2013 and which claims benefit to German Patent Application No. 10 2012 105 831.8, filed on Jul. 2, 2012. The International Application was published in German on Jan. 9, 2014 as WO 2014/005977 A1 under PCT Article 21(2).

FIELD

The present invention relates to a steering system for a vehicle having at least two wheels which can be steered independently of one another, and a steering setpoint generator which steers the wheels according to a steering program, and to a steering method of a vehicle.

BACKGROUND

The steering system is in particular provided for a multi-directional transport vehicle which is used to transport goods, in particular in factory halls or on factory premises. Such steering system can comprise devices for picking up and setting down the goods. These devices can be a transport fork disposed on a mast so as to be raisable and lowerable, or a device that is adapted to the goods to be transported.

To be able to use these transport vehicles, in particular in factory halls where comparatively little space is generally available, the transport vehicles are designed as multi-directional vehicles in which all of the at least two, for example, three, four or even more wheel sets are steered, and at least one of the wheel sets is also rotationally driven.

The individual wheel sets can be composed of a single wheel, or also of multiple wheels, for example, arranged in pairs, wherein the latter is in particular advantageous when the transport vehicle is to be used for relatively heavy loads.

In order to coordinate the steering angles of the steered wheel sets, these multi-directional transport vehicles routinely comprise a steering system which can, for example, comprise the below listed steering programs from which the operator can select both when traveling longitudinally and when traveling transversely offset therefrom by an angle of 90°:

Positioning all wheels in the longitudinal or transverse direction, i.e., the transport vehicle moves straight ahead in the longitudinal or transverse direction.

All-wheel steering, i.e., all steered wheels are steered by a steering element when the steering is actuated so that a correct steering geometry is obtained. This has the result that the rotational axes of all wheels intersect in one point, which is known as the steering point or center of steering.

Diagonal steering, i.e., during a steering process, the wheels are steered out of the longitudinal or transverse direction thereof in the same direction of rotation so that the center of steering (as with pure longitudinal or transverse traveling) is at infinity.

Front or rear axle steering, i.e., the wheels disposed at the front or rear are steered relative to the particular direction of movement, for example, relative to the center of steering.

The steering system can also include special steering programs, such as for a carousel model, wherein the wheels are steered so that the vehicle rotates in a circle about a vertical axis, or for parking, where the rotational axes of at least some of the wheels are oriented perpendicularly to one another for the purpose of preventing the vehicle from rolling away.

It is possible to switch between the individual steering programs during travel. The driver therefore does not need to stop the transport vehicle, for example, when leaving a long goods aisle, where the vehicle is usually operated with the wheels oriented in a straight-ahead position, in order to switch to all-wheel steering, for example, which entails significant time savings.

The disadvantage in the steering system described in DE 201 17 198 U1 is that the switch of the steering program during travel can result in relatively abrupt directional changes which are quite difficult for an operator to control.

A steering system for a transport vehicle is described in EP 1 657 140 B1 which can be steered independently of specific steering programs so that is as variable as possible and therefore maneuver-friendly.

The above steering system therefore comprises a first further operating element for continuously displacing the steering line, and a further second operating element for continuously steering the principal direction of the vehicle, in addition to the steering setpoint generator (such as a steering wheel). A steering system is thereby to be created with which an intuitive steering is provided to increase flexibility of the steering system.

The disadvantage of the above steering system is, however, that the total of three steering setpoint generators require significant practice by the operating staff in order to steer a vehicle configured with this steering system with sufficient precision.

SUMMARY

In an embodiment, the present invention provides a steering system for a vehicle which allows for a variable and intuitive steering process.

In an embodiment, the present invention provides a steering system for a vehicle which includes at least two wheels configured to be steered independently of each another. A steering setpoint generator is configured to steer the at least two wheels according to a steering program. An operating element is configured to rotate the vehicle during travel about a center of rotation which moves with a principal movement vector. The steering program is configured so that a direction of the principal movement vector of the center of rotation can be changed with the steering setpoint generator.

BRIEF DESCRIPTION OF THE DRAWINGS

The present invention is described in greater detail below on the basis of embodiments and of the drawings in which.

DETAILED DESCRIPTION

In an embodiment, the present invention provides an operating element in the steering system via which the vehicle can be caused to rotate about a center of rotation during travel. In so doing, the rotation is not to take place in a vehicle that otherwise sits still, i.e., does not cover any travel distance, which would correspond to a conventional "carousel mode", but in a vehicle that is traveling. After the rotation about the center of rotation has been initiated, the latter thus moves exclusively in the travel direction, while the vehicle parts located outside the center of rotation move in directions that result from a vector addition of the movement vector of the center of rotation (also referred to as the "principal movement vector") and the direction vector at the particular location based on carousel travel about the pivot point.

The term "center of rotation" as used herein does not in particular denote the center of steering of the vehicle in which the rotational axes of all wheels intersect. The term "center of rotation" as used herein denotes in particular the instantaneous center of the rotation of the vehicle which is considered separately from the (albeit curved) translatory movement.

A translatory movement (albeit curved) as used herein denotes in particular a movement of the vehicle in which all the points of the vehicle move in the same direction along one path so that the direction of the principal axis of the vehicle does not change.

The steering program of this steering system is designed so that the direction of the principal movement vector of the center of rotation can be changed via the steering setpoint generator, for example, a steering wheel.

The steering setpoint generator can thus control the path of the (albeit curved) translatory movement of the vehicle.

In an embodiment of the present invention, an operating element, or a function of an operating element, is provided (for example, exactly one operating element, or exactly one function of an operating element), via which (for example, exclusively) the vehicle can be caused to rotate about a center of rotation during travel.

Causing the vehicle to rotate about a center of rotation during travel can thus, for example, be separately activated.

No such rotation of the vehicle takes place, for example, when the operating element, via which the vehicle can be caused to rotate about a center of rotation during travel, is not actuated. The vehicle then always maintains the same orientation with respect to the surroundings, i.e., the direction of the principal axis of the vehicle with respect to the surroundings does not change even with a directional change of the principal movement vector.

In an embodiment of the present invention, a selectable steering program can be provided which automatically orients the principal axis of the vehicle in the new direction of the principal movement vector in the event of a directional change of the principal movement vector, as long as the operating element, via which the vehicle can be caused to move about a center of rotation during travel, is not actuated. The steering behavior then corresponds to or resembles that of a conventional motor vehicle.

The steering system according to the present invention results in entirely new steering options of the vehicle for the operator since it is possible, with the aid of the steering wheel, to bring about directional changes of the movement of the center of rotation (i.e., directional changes of the principal movement vector) while the vehicle is able to rotate about the center of rotation. In other words, desired movements of the vehicle can be steered in an entirely new manner.

The steering process can be controlled well with some practice when using the herein described steering system if the rotation about the center of rotation takes place relatively slowly, i.e., at a rotational speed that allows the operator to nonetheless detect the travel direction characterized by the principal movement vector and to steer. The steering process can in particular be made easier with increasing rotational speed about the center of rotation when the vehicle comprises a steering stand or a steering cab which always remains at the same angle with respect to the direction of travel, i.e., beneath which the vehicle rotates.

In an embodiment of the present invention, only the rotational movement about the center of rotation can be generated or aborted with the aid of the operating element, wherein the center of rotation assumes a fixed position relative to the projection area of the vehicle. Said position can be provided both outside the perpendicular projection area of the vehicle, and inside thereof, for example, coinciding at least approximately with the geometric center of gravity of the perpendicular projection area.

It is also possible to design the operating element and the steering program so that the position of the center of rotation relative to this projection area of the vehicle can be displaced. Very particular maneuvering movements of the vehicle can be generated based on this refinement.

In an embodiment of the present invention, an operating element, or a function of an operating element, can, for example, be provided (for example, exactly one operating element, or exactly one function of an operating element), via which (for example, exclusively) the position of the center of rotation relative to this projection area of the vehicle can be displaced.

The displacement of the position of the center of rotation relative to this projection area of the vehicle can, for example, thus be separately activated. It has been shown that this corresponds to the intuitive movement notion of a driver in the best possible manner.

The displacement of the position of the center of rotation can moreover also be generated in a manner that is sensitive to the surroundings, for example, via setpoint generators recessed in the floor from which the steering program receives appropriate information via suitable sensors or, for example, by way of optoelectronic detection of ambient marks with the aid of sensors suitable for this purpose.

The steering program can be designed so that the angle of rotation about the center of rotation is dependent on the length of the principal movement vector. The rotational speed about the center of rotation therefore increases or decreases with the speed with which the center of rotation is moved, for example, so that the vehicle at a particular position of the path along which the traveling movement takes place always has a particular orientation regardless of the travel speed.

In an embodiment of the present invention, the dependence between the angle of rotation about the center of rotation and the length of the principal movement vector can, for example, be varied. During an acceleration of the movement of the center of rotation, for example, the rotational movement relative thereto can be slowed down so as not to reach travel states that cannot be controlled by the operator.

It is also possible for the dependence between the angle of rotation about the center of rotation and the length of the principal movement vector to be automatic in a manner that is sensitive to the surroundings, again by the detection of setpoint generators that are, for example, recessed in the floor and equipped with suitable sensors, or also by the optoelectronic detection of ambient marks by the steering system, while taking the change of the principal movement vector into consideration.

The present invention also relates to a steering method for a vehicle in which all the wheels of the vehicle are steered so that the vehicle is caused to rotate, during travel, about a center of rotation which moves with a principal movement vector, and the direction of the principal movement vector of the center of rotation is changed.

A displacement of the position of the center of rotation relative to this projection area of the vehicle can, for example, be separately activated.

The present invention will be described in more detail below based on the accompanying drawings.

Figure 1:
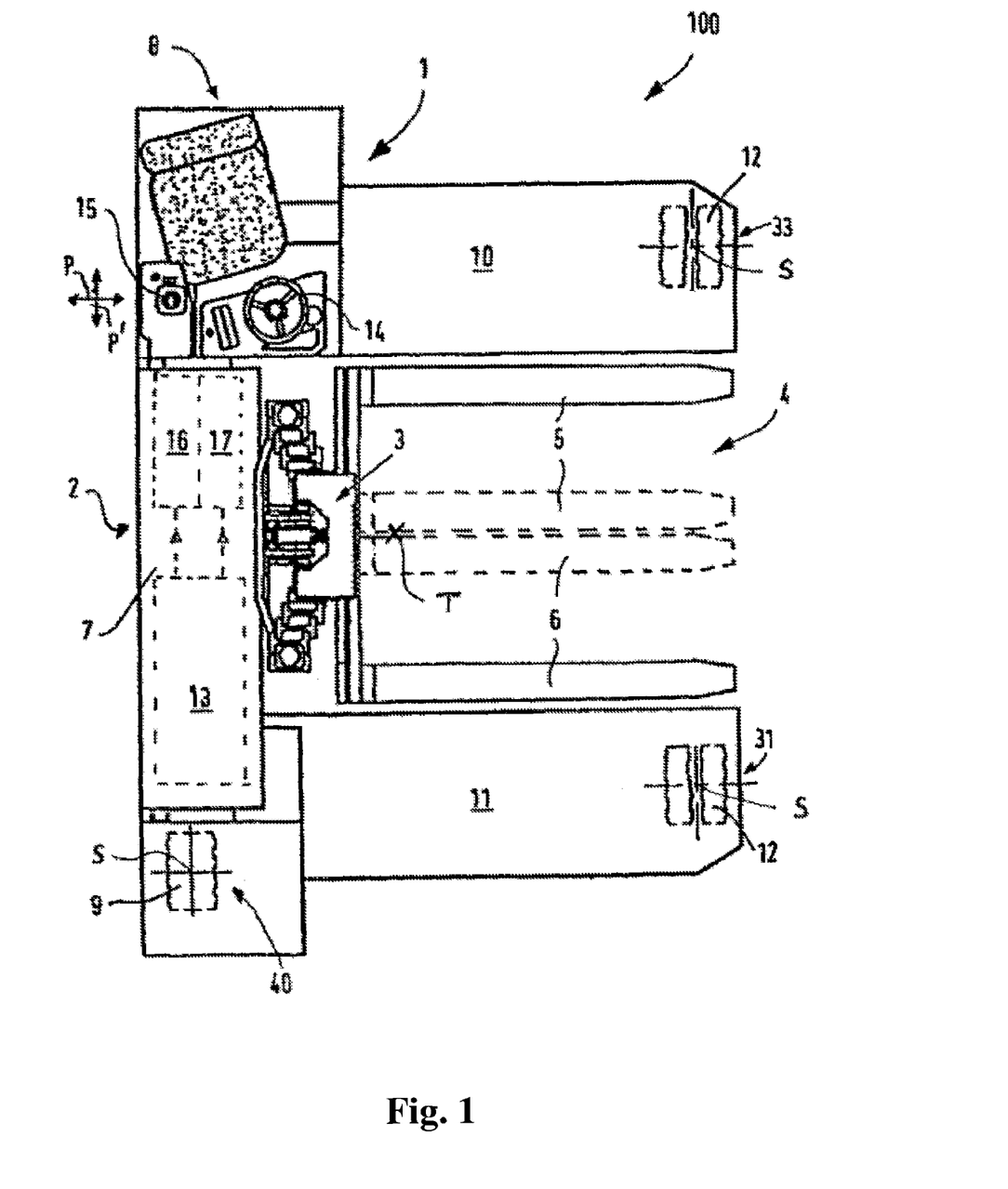
FIG. 1 schematically shows a view from above onto a multi-directional transport vehicle using the example of a multi-directional forklift.

The multi-directional transport vehicle, which here is designed as a multi-directional forklift truck and is denoted as a whole by reference numeral 100 in FIG. 1, has an approximately U-shaped chassis 1 viewed from above. On the cross beam 2 of the U, it carries an upright mast 3, on which a fork assembly 4 is disposed so as to be raisable and lowerable. The fork assembly 4 is designed so that the prongs 5, 6 thereof can be displaced between a remote position, shown by solid lines in FIG. 1, and a neighboring position, shown by dotted lines in FIG. 1, so as to be able to adapt the distance thereof to the respective goods to be transported.

A housing 7 is additionally disposed on the cross beam 2 of U, the housing 7 accommodating a majority of the units and devices that are required to operate the multi-directional transport vehicle 100 and a battery array 13.

According to FIG. 1, a wheel 9 is indicated in each case at the bottom and the top of the cross beam 2 (the top wheel 9 being hidden in FIG. 1 by an illustration of a control stand 8) the wheel 9 being driven by a motor (which is not represented in the drawing). On the segments 10, 11 of the chassis 1 extending from the cross beam 2 to the right in FIG. 1, wheel assemblies 12 are provided in the respective end region, which are designed as twin wheels in the shown exemplary embodiment.

All the wheels 9 and wheel assemblies 12 are disposed so as to be steerable about a steering axis S extending perpendicularly to the drawing plane by a steering angle of at least 180°.

The control stand 8 shown in FIG. 1 at the upper end of the cross beam 2 includes the operating devices to be actuated by an operator (not shown) for operating the multi-directional transport vehicle 100, which include a steering wheel 14 and an operating element 15 designed as a joystick that can be pivoted to the left or right (as is indicated by the arrows P, P' in FIG. 1), as viewed from the operator's perspective, which are used to activate the conventionally designed steering devices (which are not shown in greater detail in the drawing) via a central control system 18, as will be described in more detail hereafter.

The control stand 8 moreover includes a device that is not shown in greater detail, for example, a "gas pedal", which provides the setpoint value for the driving power of the driving motors (not shown in the drawing) which is provided by the control units 16, 17.

In the exemplary embodiment of the multi-directional transport vehicle 100 shown in FIG. 1, the control stand 8 is designed to be fixed with respect to the chassis 1. It is also possible, however, to design the control stand 8 so as to rotate with respect to the chassis 1 so that the operator can always assume a particular position with respect to the travel direction, which can be characterized by a principal movement vector and will be described in greater detail hereafter.

Figure 2:
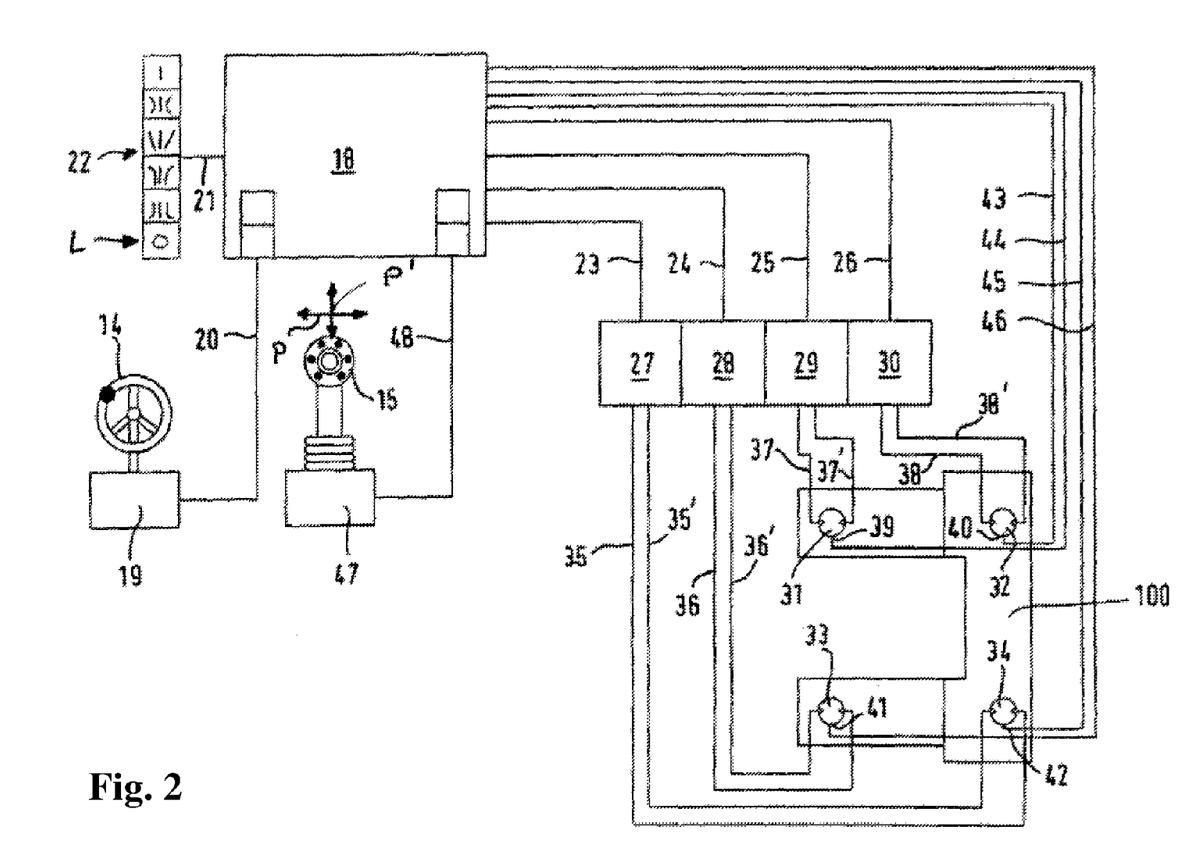
FIG. 2 shows a schematic illustration of the control system provided in a multi-directional transport vehicle according to the present invention.

As is illustrated in FIG. 2, the steering wheel 14 is connected to a steering setpoint generator 19 which converts the position of the steering wheel 14 into correlated electrical signals. The latter are supplied to the central control system 18 via an electrical line 20. The system converts the data received from the steering setpoint generator 19 into signals as a function of the respective steering program predefined by way of a keyboard 22 that is connected to the central control system 18 via a line 21, the signals being supplied via lines 23, 24, 25, 26 to hydraulic valves 27, 28, 29, 30 for the purpose of actuating the steering devices 31, 32, 33, 34 of the wheel sets 12 of the multi-directional transport vehicle 100.

Each of the steering devices 31, 32, 33, 34 comprises a hydraulic motor (which are not respectively shown in the drawing) which is respectively connected to respective hydraulic valves 27, 28, 29, 30 via two hydraulic lines 35, 35'; 36, 36'; 37, 37'; 38, 38' and is supplied with hydraulic fluid depending on the setpoint steering angles predefined by the central control system 18.

Each of the steering devices 31, 32, 33, 34 designed otherwise in the conventional manner comprises steering angle sensors 39, 40, 41, 42, which provide an electrical signal that correlates with the respective actual steering angle to the central control system 18 via electrical lines 43, 44, 45, 46 so that a control of the steering devices 31, 32, 33, 34 in the narrower sense takes place.

The operating element 15 designed as a joystick is connected to the central control system 18 via a signal generator 47 and an electrical line 48.

Figure 3:
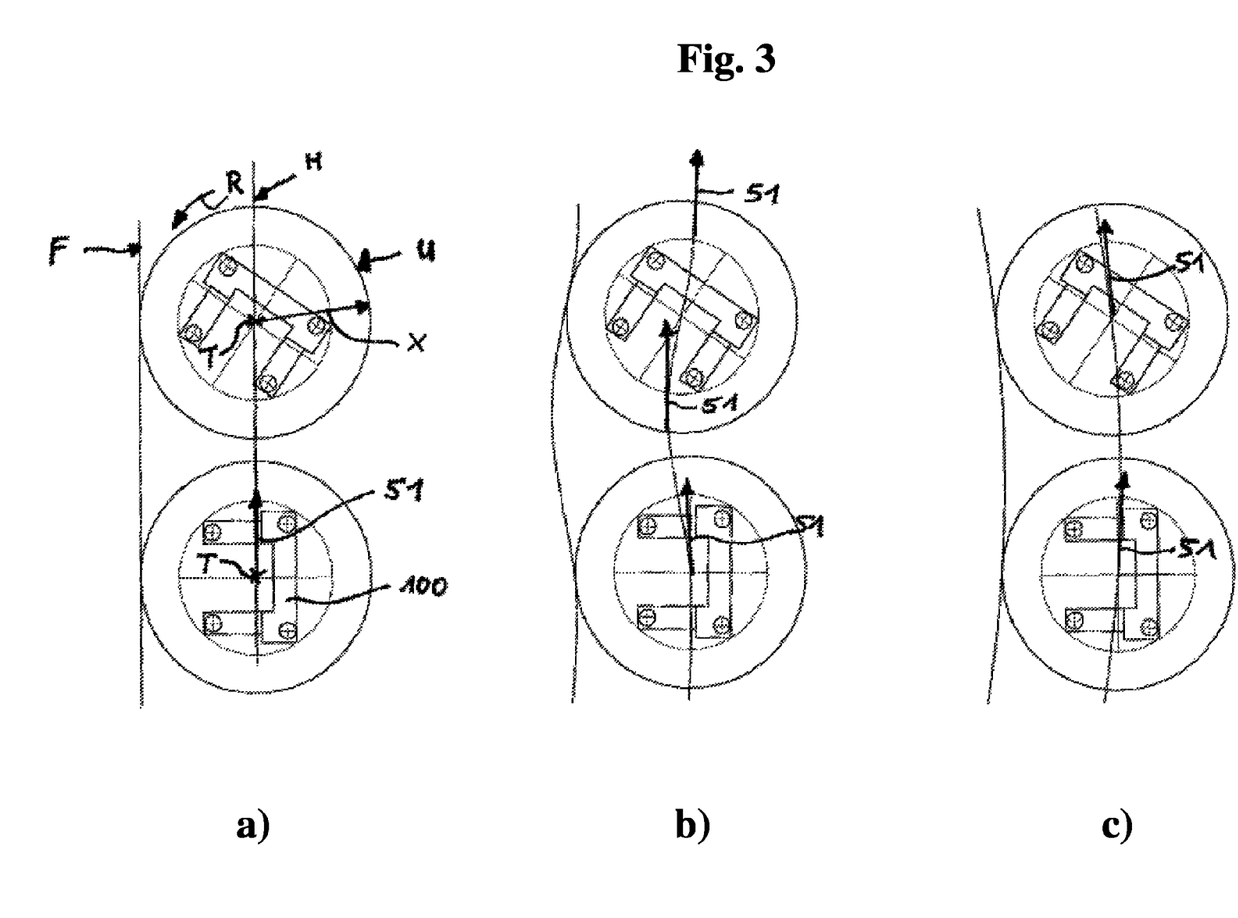
FIG. 3 schematically shows different sequences a) to c) of motion of the multi-directional transport vehicle which can be brought about by the steering system according to the present invention.
Figure 4:
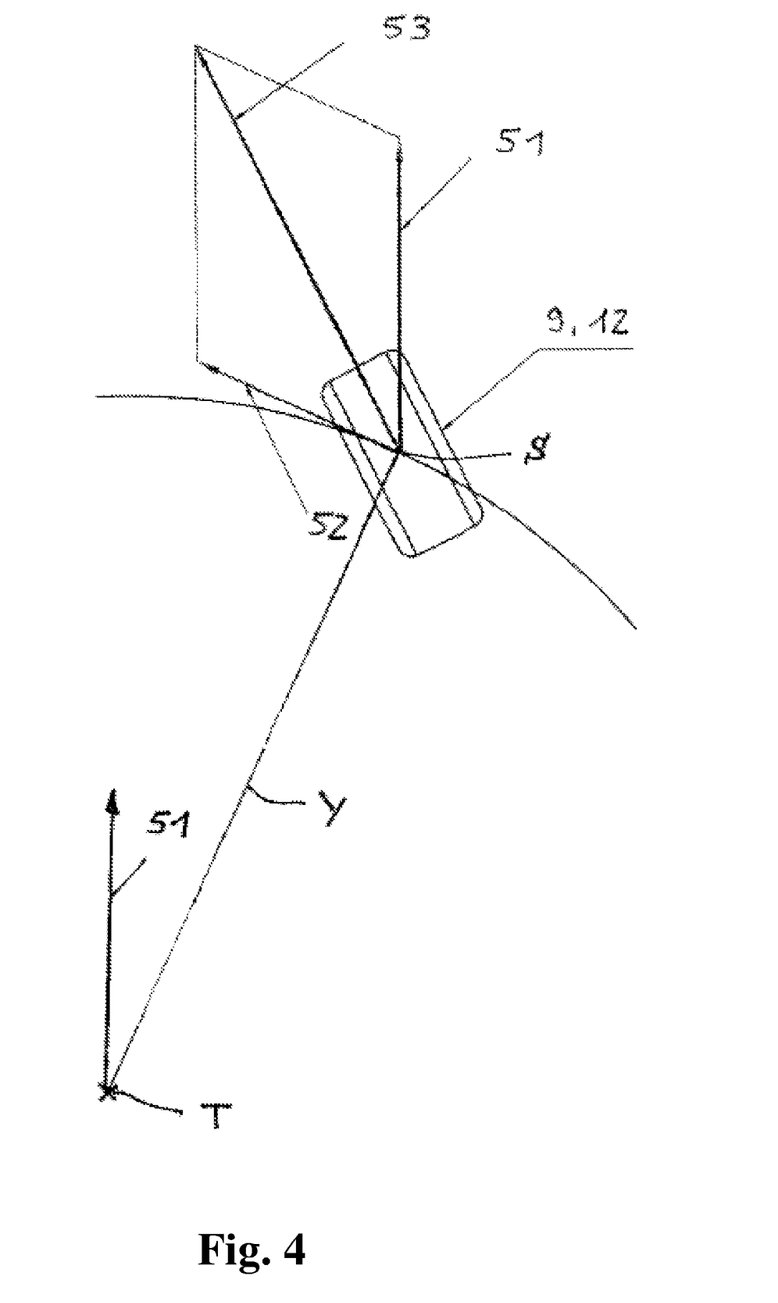
FIG. 4 shows vectors determining the steering angle of a wheel during a movement of the multi-directional transport vehicle with the steering system according to the present invention.

When the steering program symbolized by a circle in FIG. 2 and denoted by reference sign L, which characterizes the steering system according to the present invention, is selected, the actuation of the operating element 15 to the left and right according to the arrow P can cause the multi-directional transport vehicle to rotate counterclockwise or clockwise about a center of rotation T, and more specifically while maintaining the travel direction of the vehicle, which is characterized by the principal movement vector 51 (see in particular FIG. 3 and FIG. 4).

In the exemplary embodiment shown in the drawing, the center of rotation T coincides at least approximately with the geometric center of gravity of the perpendicular projection area of the multi-directional transport vehicle 100. In this way, the space that the multi-directional transport vehicle 100 requires when traveling with the steering system according to the present invention is minimized. In the exemplary embodiment shown in the drawing, however, it is likewise possible to displace the center of rotation T in parallel with the longitudinal extension of the segments 10, 11 if the maneuvering activity to be delivered by the multi-directional transport vehicle 100 indicates that a rotation about a center of rotation that is remote from the geometric center of gravity is advantageous. The displacement of the center of rotation T occurs by tilting of the operating element 15 in accordance with the arrow P' in the exemplary embodiment shown in the drawing.

Exactly one function of an operating element is thus provided for (namely, that of tilting the operating element 15 according to the arrow P'), by means of which exclusively the position of the center of rotation relative to the perpendicular projection area of the vehicle can be displaced. The position of the center of rotation can thus be activated separately.

It is also possible to change the orientation of the principal movement vector 51, i.e., the principal movement direction, in the steering system according to the present invention during a rotation of the multi-directional transport vehicle 100 about the center of rotation T. As a result of a steering wheel excursion to the left, for example, the principal movement vector 51 is tilted to the left, whereby the vehicle performs a curve to the left, on which the rotational movement about the center of rotation T is superimposed; with a steering wheel deflection to the right, a corresponding curve to the right takes place.

Different sequences of motion are illustrated by way of example in a) to c) in FIG. 3.

In the sequence of motion according to a) of FIG. 3, the principal movement direction H is a straight line. The steering wheel 14 is in the straight-ahead position. During this straight-ahead travel, the multi-directional vehicle 100 performs a counterclockwise rotation, symbolized by the arrow R. This rotation is initiated by an actuation of the operating element 15 according to the arrow P to the left. During the travel illustrated in a) of FIG. 3, the vehicle 100 carries out a movement in which the principal movement vector 51 coincides with the principal movement direction H. At the same time, the vehicle rotates about the center of rotation T in a manner as if it had a circular outer circumference U which rolls off on a surface F extending in parallel to the principal movement direction H. The rotational speed with which the multi-directional transport vehicle 100 rotates about the center of rotation T during travel in the principal movement direction H can be illustrated by the radius X of the circle having the outer circumference U. An increase in the rotational speed relative to the distance covered in the principal movement direction H corresponds to a reduction of the radius X, and a reduction in the rotational speed accordingly corresponds to an increase of the radius. To change the rotational speed about the center of rotation T relative to the distance covered in the principal movement direction H, the operating element 15 can comprise a further actuator (which is not shown in the drawing). The actuator can alternatively be designed so that the rotational speed relative to the principal movement direction is dependent on the excursion from a neutral position.

In the sequence of motion shown in b) of FIG. 3, the operating element 15 is used to actuate the multi-directional transport vehicle 100 in the same manner as in the sequence of motion according to a) of FIG. 3. The steering wheel 14 is, however, used to control the multi-directional transport vehicle in a left-right-left serpentine so that the direction of the principal movement vector 51 continuously changes from straight-ahead travel initially to the left, then to the right, and finally back again to the straight-ahead travel.

In the sequence of motion shown by way of example in c) of FIG. 3, the principal movement direction H follows a curve to the left. The steering wheel 14 is in an excursion out of the neutral position to the left; the operating element 14 is in the same position as in the two other sequences of motion according to a) to b) of FIG. 3.

To implement such sequences of motion, the wheels 9 and wheel assemblies 12 are steered taking the quantities illustrated by FIG. 4 into consideration.

Initially, the principal movement direction, which is determined by the direction of the principal movement vector 51, is decisive. The length of the same is a measure of the speed of the multi-directional transport vehicle 100 in the principal movement direction.

If the multi-directional transport vehicle 100 carries out a rotation about the center of rotation T which is superimposed on this principal movement direction and which is removed by the radius Y from the steering axis S of the wheel 9 or of the wheel assembly 12, then the wheel 9 or the wheel assembly 12 must be brought into a steering angle that takes the movement component caused by the rotation into consideration, which is determined by the tangential movement vector 52 that is present tangentially on the circle having the radius Y at the location of the steering axis S. The length of the vector is a measure of the rotational speed. The steering angle that the wheel 9 or the wheel assembly 12 must assume thereto is determined by the resulting wheel direction vector 53. The length of the wheel direction vector 53 is again a measure of the speed with which the wheel 9 or the wheel assembly 12 is moving at that moment. If the wheel 9 or the wheel assembly 12 is rotationally driven, the rotational speed with which the wheel 9 or the wheel assembly 12 must be driven can be determined by the length of the wheel direction vector 53.

The present invention is not limited to embodiments described herein; reference should be had to the appended claims.

LIST OF REFERENCE NUMERALS

100 multi-directional transport vehicle
1 chassis
2 cross beam
3 mast
4 fork assembly
5 prong
6 prong
7 housing
8 control stand
9 wheel
10 segment
11 segment
12 wheel assemblies
13 battery array
14 steering wheel
15 operating element
16 control unit
17 control unit
18 central control system
19 steering setpoint generator
20 electrical line
21 line
22 keyboard
23 line
24 line
25 line
26 line
27 hydraulic valve
28 hydraulic valve
29 hydraulic valve
30 hydraulic valve
31 steering device
32 steering device 33 steering device
34 steering device
35, 35' hydraulic line
36, 36' hydraulic line
37, 37' hydraulic line
38, 38' hydraulic line
39 steering angle sensor
40 steering angle sensor
41 steering angle sensor
42 steering angle sensor
43 electrical line
44 electrical line
45 electrical line
46 electrical line
47 signal generator
48 electrical line
51 principal movement vector
52 tangential movement vector
53 wheel direction vector
F surface
H principal movement direction
L steering program
P, P' arrows
R arrow
S steering axis
T center of rotation
U outer circumference
X radius
Y radius

What is claimed is:

1. A steering system for a vehicle, the steering system comprising:
    at least two wheels configured to be steered independently of each another;
    a steering program;
    a steering setpoint generator configured to steer the at least two wheels according to the steering program;
    an operating element configured to rotate the vehicle during travel about a center of rotation which moves with a principal movement vector,
    wherein,
    the steering program is configured so that a direction of the principal movement vector of the center of rotation can be changed with the steering setpoint generator,
    the center of rotation comprises an angle of rotation,
    the principal movement vector comprises a length, and
    the angle of rotation about the center of rotation is dependent on the length of the principal movement vector.

2. The steering system as recited in claim 1, wherein,
    the center of rotation comprises a position,
    the vehicle comprises a perpendicular projection area, and
    the position of the center of rotation relative to the perpendicular projection area of the vehicle is displaceable.

3. The steering system as recited in claim 2, wherein the displacing of the position of the center of rotation is configured so as to be sensitive to surroundings.

4. The steering system as recited in claim 3, wherein the sensitivity to the surroundings is performed by an optoelectronic detection of ambient marks.

5. The steering system as recited in claim 2, wherein the center of rotation is located inside the perpendicular projection area of the vehicle.

6. The steering system as recited in claim 2, wherein the perpendicular projection area comprises a geometric center of gravity, and the center of rotation approximately coincides with the geometric center of gravity of the perpendicular projection area.

7. The steering system as recited in claim 1, wherein the dependence between the angle of rotation about the center of rotation and the length of the principal movement vector is variable.

8. The steering system as recited in claim 7, wherein the dependence between the angle of rotation about the center of rotation and the length of the principal movement vector can be varied by the operating element.

9. The steering system as recited in claim 1, wherein the dependence between the angle of rotation about the center of rotation and the length of the principal movement vector is configured so as to automatically be sensitive to surroundings.

10. The steering system as recited in claim 9, wherein the automatic sensitivity to the surroundings is performed via an optoelectronic detection of ambient marks and a change of the principal movement vector.

11. A method of steering for a vehicle comprising the steering system as recited in claim 1, the method comprising:
    steering the at least two wheels so that the vehicle rotates during travel about the center of rotation which is displaced with the principal movement vector so that the direction of the principal movement vector of the center of rotation is changed.

12. A steering system for a vehicle, the steering system comprising:
    at least two wheels configured to be steered independently of each another;
    a steering program;
    a steering setpoint generator configured to steer the at least two wheels according to the steering program;
    an operating element configured to rotate the vehicle during travel about a center of rotation which moves with a principal movement vector,
    wherein,
    the steering program is configured so that a direction of the principal movement vector of the center of rotation can be changed with the steering setpoint generator,
    the center of rotation comprises a position,
    the vehicle comprises a perpendicular projection area,
    the position of the center of rotation relative to the perpendicular projection area of the vehicle is displaceable, and
    the displacing of the position of the center of rotation is configured so as to be sensitive to surroundings.

13. The steering system as recited in claim 12, wherein the sensitivity to the surroundings is performed by an optoelectronic detection of ambient marks.

14. The steering system as recited in claim 12, wherein the center of rotation is located inside the perpendicular projection area of the vehicle.

15. The steering system as recited in claim 12, wherein the perpendicular projection area comprises a geometric center of gravity, and the center of rotation approximately coincides with the geometric center of gravity of the perpendicular projection area.

16. The steering system as recited in claim 12, wherein,
    the center of rotation comprises an angle of rotation,
    the principal movement vector comprises a length, and
    the angle of rotation about the center of rotation is dependent on the length of the principal movement vector.

17. The steering system as recited in claim 16, wherein the dependence between the angle of rotation about the center of rotation and the length of the principal movement vector is variable.

18. The steering system as recited in claim 17, wherein the dependence between the angle of rotation about the center of rotation and the length of the principal movement vector can be varied by the operating element.

19. The steering system as recited in claim 16, wherein the dependence between the angle of rotation about the center of rotation and the length of the principal movement vector is configured so as to automatically be sensitive to surroundings.

20. The steering system as recited in claim 19, wherein the automatic sensitivity to the surroundings is performed via an optoelectronic detection of ambient marks and a change of the principal movement vector.

21. A method of steering for a vehicle comprising the steering system as recited in claim 12, the method comprising:
 steering the at least two wheels so that the vehicle rotates during travel about the center of rotation which is displaced with the principal movement vector so that the direction of the principal movement vector of the center of rotation is changed.

22. A steering system for a vehicle, the steering system comprising:
 at least two wheels configured to be steered independently of each another;
 a steering program;
 a steering setpoint generator configured to steer the at least two wheels according to the steering program;
 an operating element configured to rotate the vehicle during travel about a center of rotation which moves with a principal movement vector,
 wherein,
 the steering program is configured so that a direction of the principal movement vector of the center of rotation can be changed with the steering setpoint generator,
 the center of rotation comprises a position,
 the vehicle comprises a perpendicular projection area,
 the position of the center of rotation relative to the perpendicular projection area of the vehicle is displaceable, and
 the center of rotation is located inside the perpendicular projection area of the vehicle.

23. The steering system as recited in claim 22, wherein the displacing of the position of the center of rotation is configured so as to be sensitive to surroundings.

24. The steering system as recited in claim 22, wherein the sensitivity to the surroundings is performed by an optoelectronic detection of ambient marks.

25. The steering system as recited in claim 22, wherein the perpendicular projection area comprises a geometric center of gravity, and the center of rotation approximately coincides with the geometric center of gravity of the perpendicular projection area.

26. The steering system as recited in claim 22, wherein, the center of rotation comprises an angle of rotation, the principal movement vector comprises a length, and the angle of rotation about the center of rotation is dependent on the length of the principal movement vector.

27. The steering system as recited in claim 26, wherein the dependence between the angle of rotation about the center of rotation and the length of the principal movement vector is variable.

28. The steering system as recited in claim 27, wherein the dependence between the angle of rotation about the center of rotation and the length of the principal movement vector can be varied by the operating element.

29. The steering system as recited in claim 26, wherein the dependence between the angle of rotation about the center of rotation and the length of the principal movement vector is configured so as to automatically be sensitive to surroundings.

30. The steering system as recited in claim 29, wherein the automatic sensitivity to the surroundings is performed via an optoelectronic detection of ambient marks and a change of the principal movement vector.

31. A method of steering for a vehicle comprising the steering system as recited in claim 22, the method comprising:
 steering the at least two wheels so that the vehicle rotates during travel about the center of rotation which is displaced with the principal movement vector so that the direction of the principal movement vector of the center of rotation is changed.

32. A steering system for a vehicle, the steering system comprising:
 at least two wheels configured to be steered independently of each another;
 a steering program;
 a steering setpoint generator configured to steer the at least two wheels according to the steering program;
 an operating element configured to rotate the vehicle during travel about a center of rotation which moves with a principal movement vector,
 wherein,
 the steering program is configured so that a direction of the principal movement vector of the center of rotation can be changed with the steering setpoint generator,
 the center of rotation comprises a position,
 the vehicle comprises a perpendicular projection area,
 the position of the center of rotation relative to the perpendicular projection area of the vehicle is displaceable, and
 the perpendicular projection area comprises a geometric center of gravity, and the center of rotation approximately coincides with the geometric center of gravity of the perpendicular projection area.

33. The steering system as recited in claim 32, wherein the displacing of the position of the center of rotation is configured so as to be sensitive to surroundings.

34. The steering system as recited in claim 32, wherein the sensitivity to the surroundings is performed by an optoelectronic detection of ambient marks.

35. The steering system as recited in claim 32, wherein the center of rotation is located inside the perpendicular projection area of the vehicle.

36. The steering system as recited in claim 32, wherein,
 the center of rotation comprises an angle of rotation,
 the principal movement vector comprises a length, and
 the angle of rotation about the center of rotation is dependent on the length of the principal movement vector.

37. The steering system as recited in claim 36, wherein the dependence between the angle of rotation about the center of rotation and the length of the principal movement vector is variable.

38. The steering system as recited in claim 37, wherein the dependence between the angle of rotation about the center of rotation and the length of the principal movement vector can be varied by the operating element.

39. The steering system as recited in claim 36, wherein the dependence between the angle of rotation about the center of rotation and the length of the principal movement vector is configured so as to automatically be sensitive to surroundings.

40. The steering system as recited in claim 39, wherein the automatic sensitivity to the surroundings is performed via an optoelectronic detection of ambient marks and a change of the principal movement vector.

41. A method of steering for a vehicle comprising the steering system as recited in claim 32, the method comprising:

steering the at least two wheels so that the vehicle rotates during travel about the center of rotation which is displaced with the principal movement vector so that the direction of the principal movement vector of the center of rotation is changed.

\* \* \* \* \*